US012763384B2

(12) United States Patent
Kim

(10) Patent No.: US 12,763,384 B2
(45) Date of Patent: Oct. 13, 2026

(54) GRIPPER ASSEMBLY FOR CHARGING/DISCHARGING SECONDARY BATTERY, AND CHARGING/DISCHARGING DEVICE COMPRISING SAME

(71) Applicant: LG ENERGY SOLUTION, LTD., Seoul (KR)

(72) Inventor: Yong Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 672 days.

(21) Appl. No.: 18/275,105

(22) PCT Filed: Nov. 16, 2022

(86) PCT No.: PCT/KR2022/018058
§ 371 (c)(1),
(2) Date: Jul. 31, 2023

(87) PCT Pub. No.: WO2023/090840
PCT Pub. Date: May 25, 2023

(65) Prior Publication Data

US 2024/0322271 A1 Sep. 26, 2024

(30) Foreign Application Priority Data

Nov. 16, 2021 (KR) ........................ 10-2021-0157415
Nov. 15, 2022 (KR) ........................ 10-2022-0152712

(51) Int. Cl.
*H01M 10/44* (2006.01)
*H01M 50/581* (2021.01)
*H02J 7/70* (2026.01)

(52) U.S. Cl.
CPC ......... *H01M 10/44* (2013.01); *H01M 50/581* (2021.01); *H01M 2200/101* (2013.01); *H02J 7/70* (2026.01)

(58) Field of Classification Search
CPC ............... H01M 10/44; H01M 50/581; H01M 2200/101; H02J 7/70; H02J 7/65
See application file for complete search history.

(56) References Cited

U.S. PATENT DOCUMENTS

2002/0044253 A1 4/2002 Masuda et al.
2012/0293016 A1 11/2012 Schaefer et al.
(Continued)

FOREIGN PATENT DOCUMENTS

CN 107852019 A 3/2018
CN 109643832 A 4/2019
(Continued)

OTHER PUBLICATIONS

International Search Report (PCT/ISA/210) issued in PCT/KR2022/018058, dated Mar. 2, 2023.
(Continued)

*Primary Examiner* — David V Henze
(74) *Attorney, Agent, or Firm* — Birch, Stewart, Kolasch & Birch, LLP

(57) ABSTRACT

A gripper assembly for charging and discharging a secondary battery is provided. The gripper assembly includes a gripper body part configured to press an electrode lead of the secondary battery, a contact member coupled to one side of the gripper body, the contact member being configured to be pressed on a surface of the electrode lead, a safety block part located in the gripper body part, the safety block having a shape that is transformed when heat is transferred from the secondary battery to release a pressed state of the electrode lead by the gripper body part, and a heat conducting part configured to connect the secondary battery and the safety block part. A secondary battery charging and discharging including the gripper assembly is also provided.

13 Claims, 5 Drawing Sheets

(56) References Cited

U.S. PATENT DOCUMENTS

| | | | | |
|---|---|---|---|---|
| 2014/0147712 | A1 | 5/2014 | Lee | |
| 2015/0061596 | A1 | 3/2015 | Park et al. | |
| 2020/0011894 | A1* | 1/2020 | Hojo | G01R 1/0408 |

FOREIGN PATENT DOCUMENTS

| | | | | | |
|---|---|---|---|---|---|
| CN | 112042010 | A | | 12/2020 | |
| DE | 10 2012 012 790 | A1 | | 12/2013 | |
| JP | 11-219732 | A | | 8/1999 | |
| JP | 2002-169135 | A | | 6/2002 | |
| KR | 10-2007-0097814 | A | | 10/2007 | |
| KR | 10-2011-0004007 | A | | 1/2011 | |
| KR | 20110004007 | A | * | 1/2011 | H01M 10/44 |
| KR | 10-2012-0006635 | A | | 1/2012 | |
| KR | 10-1106667 | B1 | | 1/2012 | |
| KR | 20120006635 | A | * | 1/2012 | H01R 11/11 |
| KR | 10-2012-0084291 | A | | 7/2012 | |
| KR | 10-2013-0019477 | A | | 2/2013 | |
| KR | 10-2014-0089237 | A | | 7/2014 | |
| KR | 10-1451731 | B1 | | 10/2014 | |
| KR | 10-2017-0142367 | A | | 12/2017 | |
| KR | 10-2019-0072289 | A | | 6/2019 | |
| KR | 20190072289 | A | * | 6/2019 | H01M 2/26 |
| KR | 10-2020-0129429 | A | | 11/2020 | |
| KR | 10-2021-0120295 | A | | 10/2021 | |
| WO | WO 2013/110468 | A2 | | 8/2013 | |

OTHER PUBLICATIONS

Extended European Search Report for European Application No. 22896045.6, dated Nov. 22, 2024.

* cited by examiner

[FIG. 1]
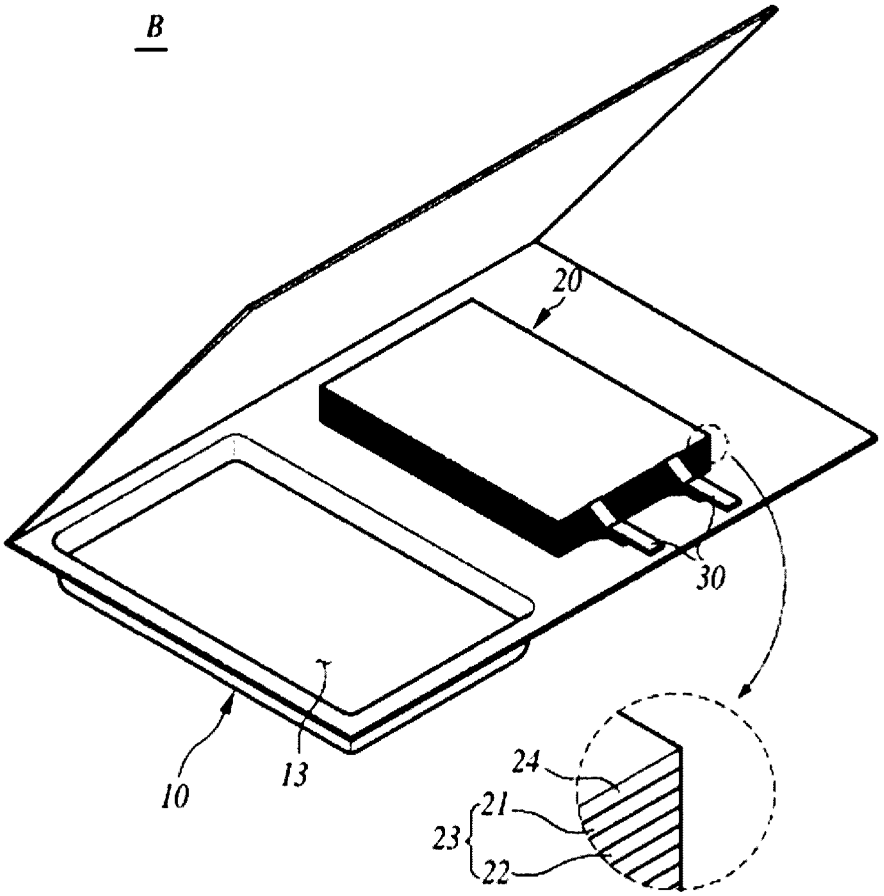
[FIG. 2]
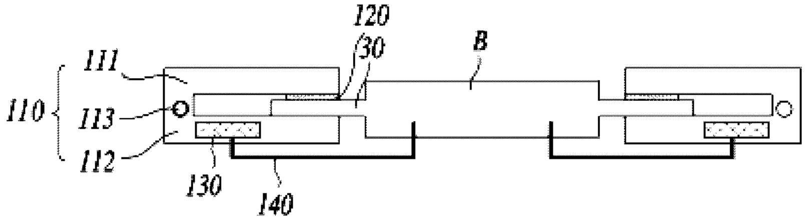
[FIG. 3]
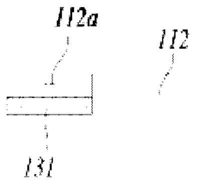

[FIG. 4]
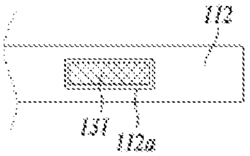
[FIG. 5]
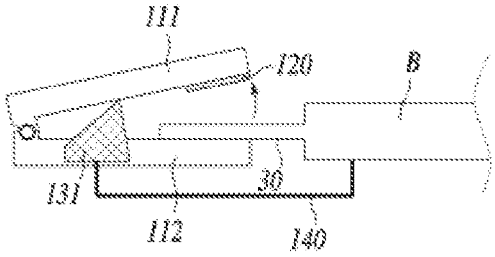
[FIG. 6]
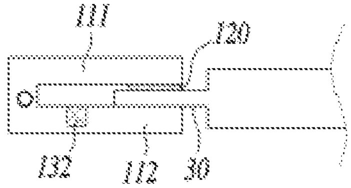
[FIG. 7]
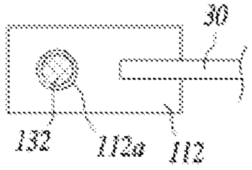
[FIG. 8]
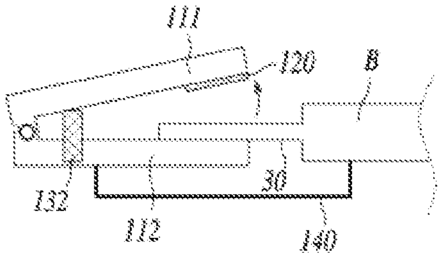

[FIG. 9]
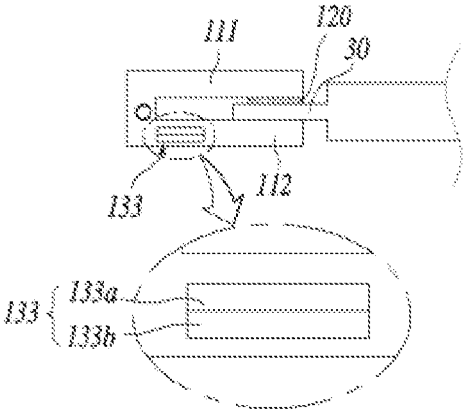
[FIG. 10]
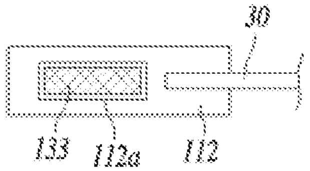
[FIG. 11]
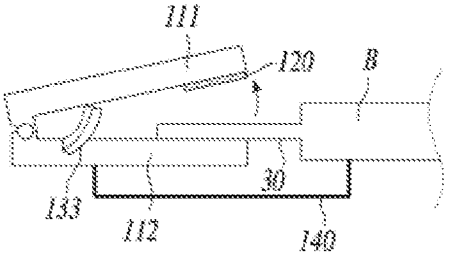

[FIG. 12]
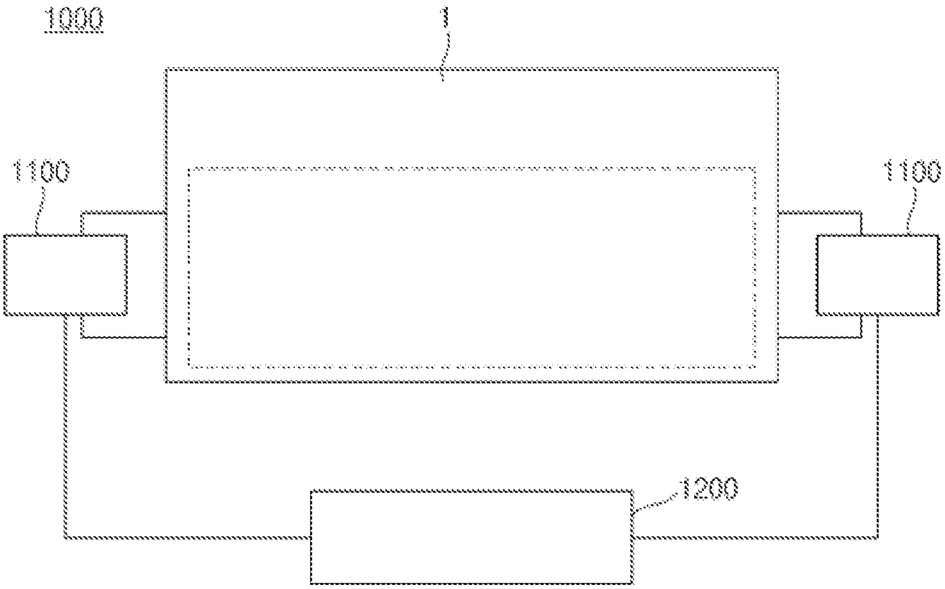

[FIG. 13]
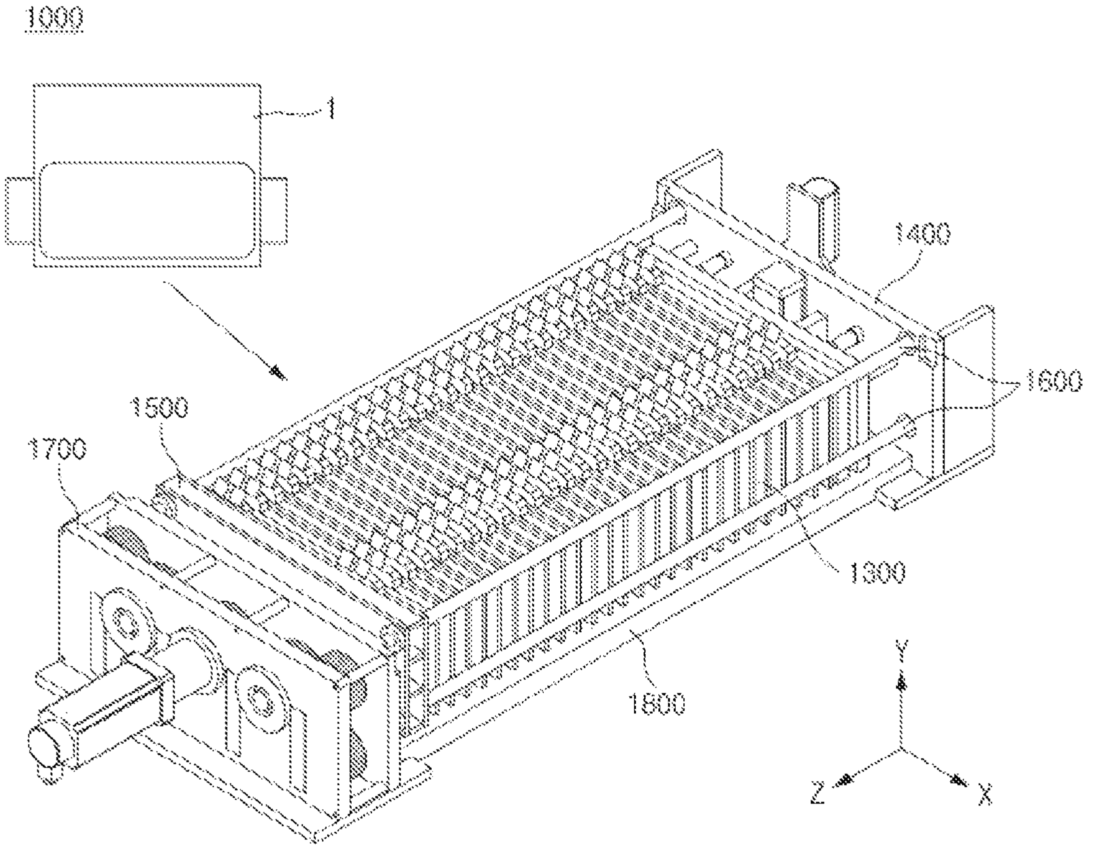

GRIPPER ASSEMBLY FOR CHARGING/DISCHARGING SECONDARY BATTERY, AND CHARGING/DISCHARGING DEVICE COMPRISING SAME

TECHNICAL FIELD

This application claims the benefit of a priority based on Korean Patent Application No. 10-2021-0157415 filed on Nov. 16, 2021 and Korean Patent Application No. 10-2022-0152712 filed on Nov. 15, 2022.

The present invention relates to a gripper assembly for charging and discharging a secondary battery and a charging and discharging device including the same for preventing swelling caused by internal defects and risk of ignition due to temperature rise during charging and discharging of the secondary battery.

Background Technology of the Invention

As technology development and demand for mobile devices increase, the demand for batteries as an energy source is rapidly increasing, and accordingly, a lot of research is being conducted on batteries that can meet various needs.

Typically, in terms of the battery shape, there is a high demand for prismatic secondary batteries and pouch-type secondary batteries that can be thinly applied to products such as mobile phones, and in terms of materials, there is a high demand for lithium secondary batteries such as lithium-ion batteries and lithium-ion polymer batteries with high energy density, high discharge voltage, and output stability.

However, as the energy density and the capacity of the secondary battery have increased, the amount of heat generated during repetitive charging and discharging processes increases, which causes an excessive temperature rise, and this not only leads to device malfunction and deterioration in operating efficiency, but also causes a significantly shortened battery life.

Therefore, in order to ensure an optimal operating state and safety of the battery, many tests performed on the product, and such tests include process of measuring electrical operating conditions such as voltage and current of the test specimen, and physical operating conditions such as temperature and pressure using a charge/discharge device.

However, during charging and discharging of the secondary battery, a swelling phenomenon may occur due to an internal defect of the secondary battery, and also, the temperature inside the secondary battery may increase. If the charging and discharging process is performed while leaving this as it is, there may be a risk of ignition in the secondary battery due to a temperature rise.

DESCRIPTION OF THE INVENTION

Technical Problem

The present invention is directed to provide a gripper assembly for charging and discharging a secondary battery and a charging and discharging device for preventing swelling caused by internal defects and risk of ignition due to temperature rise during charging and discharging of the secondary battery.

Technical Solution

The gripper assembly for charging and discharging a secondary battery according to exemplary embodiments of the present invention includes: a gripper body part configured to press an electrode lead of the secondary battery; a contact member coupled to one side of the gripper body, the contact member being configured to be pressed on a surface of the electrode lead; a safety block part located in the gripper body part, the safety block having a shape that is transformed when heat is transferred from the secondary battery to release a pressed state of the electrode lead by the gripper body part; and a heat conducting part configured to connect the secondary battery and the safety block part.

In the gripper assembly for charging and discharging a secondary battery according to an exemplary embodiment of the present invention, the gripper body part may include: a first gripper body configured to come into contact with a first surface of the electrode lead, a second gripper body configured to come into contact with a second surface of the electrode lead opposite the first surface, and a connecting member connecting the first gripper body and the second gripper body.

In the gripper assembly for charging and discharging a secondary battery according to an exemplary embodiment of the present invention, the safety block part may be located on at least one of the first gripper body and the second gripper body.

In the gripper assembly for charging and discharging a secondary battery according to an exemplary embodiment of the present invention, the safety block part may include a shape-memory alloy, and the at least one of the first gripper body and the second gripper body may include an accommodation groove accommodating the shape-memory alloy therein.

In the gripper assembly for charging and discharging a secondary battery according to an exemplary embodiment of the present invention, the shape-memory alloy may be restored to its an original form in the temperature range of 70° C. to 120° C.

In the gripper assembly for charging and discharging a secondary battery according to an exemplary embodiment of the present invention, the safety block part may include a thermally expandable metal having a thermal expansion coefficient greater than 0.02 mm/mh° C., and the at least one of the first gripper body and the second gripper body may include an accommodation groove accommodating the thermally expandable metal therein.

In the gripper assembly for charging and discharging a secondary battery according to an exemplary embodiment of the present invention, the safety block part may include a bimetal made of two metals having different coefficients of thermal expansion, and the at least one of the first gripper body and the second gripper body may include an accommodation groove accommodating the bimetal may be formed in at least one of the first and the second gripper bodies.

In the gripper assembly for charging and discharging a secondary battery according to an exemplary embodiment of the present invention, the bimetal bends to a greater degree than a thickness of the electrode lead in a temperature range of 70° C. to 120° C.

In the gripper assembly for charging and discharging a secondary battery according to an exemplary embodiment of the present invention, the contact member may be a metal material.

In the gripper assembly for charging and discharging a secondary battery according to an exemplary embodiment of the present invention, the heat conducting part may be a heat conducting wire made of aluminum or a metal having higher thermal conductivity than aluminum.

The secondary battery charging and discharging device according to an exemplary embodiment of the present invention includes: a gripper assembly described above; and a power conversion part configured to output power supplied from a current source into power suitable for battery charging, the power conversion part being configured to apply current to the secondary battery through the contact member of the gripper assembly.

The secondary battery charging and discharging device according to an exemplary embodiment of the present invention may further include: a plurality of pressing plates movable relative to each other to adjust a gap between adjacent pressing plates, each gap being configured to receive a secondary battery therein; a support member located at a first end of the plurality of pressing plates; a movable member located at a second end of the plurality of pressing plates opposite the support member; a guide member configured to guide each pressing plate of the plurality of pressing plates to move to adjust the gap; and a pressure driving part configured to press and release pressure on opposite sides of the secondary battery in the gap by moving the movable member back and forth.

In the secondary battery charging and discharging device according to an exemplary embodiment of the present invention, the gripper assembly provided in plurality, each gripper assembly being fixed to a corresponding pressing plate of the plurality of pressing plates.

Other specific details of the embodiments according to various aspects of the present invention are included in the detailed description below.

Advantageous Effects

According to an exemplary embodiment of the present invention, a risk of ignition of the secondary battery due to swelling and temperature rise caused by an internal defect of the secondary battery can be prevented during charging and discharging of the secondary battery.

BRIEF DESCRIPTION OF THE DRAWINGS

FIG. 1 is an exploded perspective view illustrating a secondary battery applied to a gripper assembly for charging and discharging a secondary battery according to embodiments of the present invention.

FIG. 2 is a side view illustrating a gripper assembly for charging and discharging a secondary battery according to embodiments of the present invention.

FIG. 3 is a side cross-sectional view showing a second gripper body including a safety block part according to the first embodiment of the present invention.

FIG. 4 is a plan view illustrating a second gripper body including a safety block part according to the first embodiment of the present invention.

FIG. 5 is a side cross-sectional view illustrating a state in which the safety block part of the second gripper body including the safety block part according to the first embodiment of the present invention releases the pressured state of the electrode lead when the internal temperature of the battery rises.

FIG. 6 is a side cross-sectional view showing a second gripper body including a safety block part according to the second embodiment of the present invention.

FIG. 7 is a plan view illustrating a second gripper body including a safety block part according to the second embodiment of the present invention.

FIG. 8 is a side cross-sectional view illustrating a state in which the safety block part of the second gripper body including the safety block part according to the second embodiment of the present invention releases the pressured state of the electrode lead when the internal temperature of the battery rises.

FIG. 9 is a side cross-sectional view showing a second gripper body including a safety block part according to the third embodiment of the present invention.

FIG. 10 is a plan view illustrating a second gripper body including a safety block part according to the third embodiment of the present invention.

FIG. 11 is a side cross-sectional view illustrating a state in which the safety block part of the second gripper body including the safety block part according to the third embodiment of the present invention releases the pressured state of the electrode lead when the internal temperature of the battery rises.

FIG. 12 is a schematic diagram of a charging and discharging device according to an exemplary embodiment of the present invention.

FIG. 13 is a diagram of a charging and discharging device according to an exemplary embodiment of the present invention.

REFERENCE NUMERALS

110: GRIPPER BODY PART 120: CONTACT MEMBER
130: SAFETY BLOCK PART 140: HEAT CONDUCTING PART
131: SHAPE-MEMORY ALLOY
132: THERMALLY EXPANDABLE METAL
133: BIMETAL
1000: CHARGING AND DISCHARGING DEVICE 1100: GRIPPER ASSEMBLY
1200: POWER CONVERSION PART
1300: PRESSING PLATE
1400: SUPPORT MEMBER
1500: MOVABLE MEMBER
1600: GUIDE MEMBER
1700: PRESSURE DRIVING PART

BEST MODE FOR CARRYING OUT THE INVENTION

The present invention may have various modifications and various examples, and thus specific examples are illustrated in the drawings and described in detail in the description. However, it should be understood that the present invention is not limited to specific embodiments, and includes all modifications, equivalents or alternatives within the spirit and technical scope of the present invention.

The terms that the present invention use are only used to explain a specific example and is not intended to limit thereto. A singular expression includes a plural expression unless the context indicates otherwise. The terms "comprise" or "have" used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance. Hereinafter, a gripper assembly for charging and discharging a secondary battery according to an exemplary embodiment of the present invention will be described with reference to the diagrams.

In the present invention, the x-axis corresponds to the horizontal direction of the secondary battery, the y-axis corresponds to the vertical direction of the secondary battery, and the z-axis corresponds to the direction of adjusting the spacing of the pressing plate and the thickness direction of the secondary battery.

First, a secondary battery will be described with reference to FIG. 1. FIG. 1 is an exploded perspective view illustrating a secondary battery applied to a gripper assembly for charging and discharging a secondary battery according to embodiments of the present invention.

Referring to FIG. 1, a secondary battery B includes a battery case 10, an electrode assembly 20 accommodated in an accommodating part 13 of the battery case 10, and an electrolyte. At this time, the electrode assembly 20 may include an electrode lead 30 electrically connected to the electrode 23.

The electrode assembly 20 is a power generating element capable of charging and discharging, and may be formed by alternately stacking electrodes 23 and separators 24.

The electrode 23 may be composed of a positive electrode 21 and a negative electrode 22. Here, the electrode assembly 20 may have a structure in which a positive electrode 21/a separator 24/a negative electrode 22 are alternately stacked. Also, the electrode leads 30 may include a positive lead connected to the positive electrode 21 and a negative lead connected to the negative electrode 22. In FIG. 1, the electrode leads 30 are illustrated as being formed in one direction of the electrode assembly 20, but may also be formed in both directions of the electrode assembly 20.

The positive electrode 21 may include a positive electrode current collector and a positive electrode active material laminated on the positive electrode current collector. The positive electrode current collector may be made of an aluminum foil. The positive electrode active material may be formed of lithium manganese oxide, lithium cobalt oxide, lithium nickel oxide, lithium iron phosphate, or a compound or a mixture containing at least one of these.

The negative electrode 22 may include a negative electrode current collector and a negative electrode active material laminated on the negative electrode current collector. The negative electrode current collector may be formed of, for example, a foil made of a copper (Cu) material. The negative electrode active material may be a compound or a mixture including a graphite-based material.

The separator 24 is made of an insulating material and electrically insulates the positive electrode 21 and the negative electrode 22 from each other. The separator 24 may be formed of a polyolefin-based resin film such as polyethylene or polypropylene having microporous properties.

Next, with reference to FIG. 2, a gripper assembly for charging and discharging a secondary battery according to the exemplary embodiments of the present invention will be described. FIG. 2 is a side view illustrating a gripper assembly for charging and discharging a secondary battery according to embodiments of the present invention.

As shown in FIG. 2, the gripper assembly for charging and discharging a secondary battery according to exemplary embodiments of the present invention includes a gripper body part 110, a contact member 120, a safety block part 130, and a heat conducting part 140.

The gripper body part 110 presses the electrode lead 30 of the secondary battery and supplies charging energy through the contact member 120. The gripper body part 110 is disposed at a position corresponding to the electrode lead 30 of the secondary battery B, and can press the electrode lead 30 via the contact member 120. In FIG. 2, the electrode leads 30 are formed in both directions of the electrode assembly 20, but as shown in FIG. 1, the electrode leads 30 may also be formed in one direction of the electrode assembly 20.

The gripper body part 110 is composed of a first gripper body 111 in contact with one surface of the electrode lead and a second gripper body 112 in contact with the other surface of the electrode lead, and an electrode lead is interposed in a gap formed between the first gripper and the second gripper so that it can be configured to press the electrode lead as the gap between the first gripper and the second gripper becomes closer.

In one specific example, the gripper body part 110 may include the first gripper body 111 disposed above the electrode leads 30, the second gripper body 112 disposed below the electrode leads 30, and a connecting member 113 connecting the first gripper body 111 and the second gripper body 112. For example, the first gripper body 111 and the second gripper body 112 may be connected and coupled by the connecting member 113 to form a tong shape as a whole. Here, the connecting member 113 may be a hinge.

The contact member 120 is coupled to one side of the gripper body 110, and is contacted by being pressed onto the surface of the electrode lead 30 by the gripper body part 110. The contact member 120 may be made of a metal material and may be formed on at least one of the first gripper body 111 and the second gripper body 112. The diagram is illustrating a state in which the contact member 120 is formed on the first gripper body 111.

Multiple sharp jaws may be formed in the contact member 120 to press the surface of the electrode lead 30, and accordingly, conductivity may be increased by increasing the pressing force with respect to the electrode lead 30. In addition, the surface of the contact member 120 may be gold-plated to further increase conductivity.

The safety block part 130 is formed on the gripper body part 110, and its shape is changed according to the heat transferred from the secondary battery B, so that the pressured state of the electrode leads 30 can be released. The safety block part 130 may be formed on at least one of the first gripper body 111 and the second gripper body 112, and the diagram illustrates the state in which the safety block part 130 is formed on the second gripper body 112.

The safety block part 130 is made of a material (or assembly) whose shape is changed by heat, and may be, for example, a shape-memory alloy, a metal having a large coefficient of thermal expansion, a bimetal, etc. This will be described later with reference to FIG. 3 to FIG. 11.

The heat conducting part 140 transfers the heat generated inside the secondary battery B to the safety block part 130 during charging and discharging. The heat conducting part 140 may be composed of a heat conducting wire connecting an aluminum included inside the secondary battery B or a pouch and the safety block part 130. The heat conducting wire may be made of an aluminum or a material having a higher thermal conductivity than aluminum (e.g., gold, silver, copper, etc.). If the heat conducting wire has a lower thermal conductivity than an aluminum, the time that takes to transfer the heat inside the secondary battery B to the safety block part 130 may be delayed, which may not be suitable for preventing ignition.

According to the gripper assembly for charging and discharging a secondary battery according to exemplary embodiments of the present invention configured as described above, swelling due to internal defects of the secondary battery and a risk of ignition of the secondary battery due to temperature rise during charging and discharging of the secondary battery can be prevented.

Hereinafter, various exemplary embodiments of the safety block part 130 will be described with reference to FIG. 3 to FIG. 11.

First, the safety block part according to the first embodiment of the present invention will be described with reference to FIG. 3 to FIG. 5. FIG. 3 is a side cross-sectional view showing a second gripper body including a safety block part according to the first embodiment of the present invention, FIG. 4 is a plan view illustrating a second gripper body including a safety block part according to the first embodiment of the present invention, and FIG. 5 is a side cross-sectional view illustrating a state in which the safety block part of the second gripper body including the safety block part according to the first embodiment of the present invention releases the pressured state of the electrode lead when the internal temperature of the battery rises.

Referring to FIG. 3 to FIG. 5, the safety block part according to the first embodiment of the present invention includes a shape-memory alloy 131. An accommodation groove 112*a* in which the shape-memory alloy 131 is accommodated is formed in the second gripper body 112.

A shape-memory alloy refers to an alloy that has a property of returning to its original shape by heating even if it is deformed into a different shape, and a titanium-nickel alloy is a typical example of an alloy exhibiting a shape-memory effect.

The original shape of the shape-memory alloy 131 is in the form of a bar with a large volume, and in a deformed shape, it is disposed in the accommodating groove 112*a* in a shape of a bar with a small volume. The shape-memory alloy 131 may increase in volume to its original shape at a reference temperature. Here, the reference temperature is preferably 70° C. to 120° C. to ensure stability against abnormal operating conditions.

During charging and discharging of the secondary battery, in the case of normal operation, the temperature does not rise or even if it rises, it rises within a range below the ignition point, so there is no risk of ignition, and as shown in FIG. 2, the gripper body 110 and the contact member 120 maintain the pressured state to the electrode leads 30.

During charging and discharging of the secondary battery, in case of an abnormal operating state due to an internal defect, etc., when the temperature rises to a range above the ignition point, as shown in FIG. 5, the shape-memory alloy 131 pushes up the first gripper body 111 as it restores to its original shape and expands in volume by the heat transferred from the secondary battery to the shape-memory alloy 131 through the heat conducting part 140. Accordingly, the gripper body part 110 and the contact member 120 release the pressured state to the electrode leads 30. As a result, power supply through the electrode leads 30 is cut off, thereby preventing the risk of ignition in the secondary battery.

Next, a safety block part according to the second embodiment of the present invention will be described with reference to FIG. 6 to FIG. 8. FIG. 6 is a side cross-sectional view showing a second gripper body including a safety block part according to the second embodiment of the present invention, FIG. 7 is a plan view illustrating a second gripper body including a safety block part according to the second embodiment of the present invention, and FIG. 8 is a side cross-sectional view illustrating a state in which the safety block part of the second gripper body including the safety block part according to the second embodiment of the present invention releases the pressured state of the electrode lead when the internal temperature of the battery rises.

Referring to FIG. 6 to FIG. 8, the safety block part according to the second embodiment of the present invention includes a thermally expandable metal 132. An accommodation groove 112*a* in which the thermally expandable metal 132 is accommodated is formed in the second gripper body 112.

In the present specification, the thermally expandable metal 132 refers to a metal with a thermal expansion coefficient higher than that of an aluminum (0.02 mm/mh° C.). This is to prevent the risk of ignition due to deformation of the aluminum included in the secondary battery B or the pouch in advance, and to prevent the risk of ignition by cutting off the power supply to the secondary battery by thermally expanding faster than the deformation of the aluminum.

During charging and discharging of the secondary battery, in the case of normal operation, there is no risk of ignition because the temperature does not rise or even if it rises, it rises within a range below the ignition point, and as shown in FIG. 2, the gripper body 110 and the contact member 120 maintain the pressured state to the electrode leads 30.

During charging and discharging of the secondary battery, in case of an abnormal operation due to an internal defect or the like, when the temperature rises to a range equal to or higher than the ignition point, as shown in FIG. 8, the thermally expandable metal 132 pushes up the first gripper body 111 while expanding in volume by the heat transferred from the secondary battery to the thermally expandable metal 132 through the heat conducting part 140. Accordingly, the gripper body part 110 and the contact member 120 release the pressured state to the electrode leads 30. As a result, power supply through the electrode leads 30 is cut off, thereby preventing the risk of ignition in the secondary battery.

Next, a safety block part according to the third embodiment of the present invention will be described with reference to FIG. 9 to FIG. 11. FIG. 9 is a side cross-sectional view showing a second gripper body including a safety block part according to the third embodiment of the present invention, FIG. 10 is a plan view illustrating a second gripper body including a safety block part according to the third embodiment of the present invention, and FIG. 11 is a side cross-sectional view illustrating a state in which the safety block part of the second gripper body including the safety block part according to the third embodiment of the present invention releases the pressured state of the electrode lead when the internal temperature of the battery rises.

Referring to FIG. 9 to FIG. 11, the safety block part according to the third embodiment of the present invention includes a bimetal 133. An accommodation groove 112*a* in which the bimetal 133 is accommodated is formed in the second gripper body 112.

The bimetal 133 is made by attaching two metals having different coefficients of thermal expansion, and is a material that has a property of being bent to one side due to a different amount of expansion according to a change in temperature using the fact that each metal has a different inherent thermal expansion coefficient.

Among the two metals 133*a*, 133*b* constituting the bimetal 133, the upper metal is preferably composed of the first metal 133*a* having a smaller coefficient of thermal expansion, and the lower metal is preferably composed of the second metal 133*b* having a larger coefficient of thermal expansion than the first metal. During thermal expansion, the first metal 133*a* expands relatively small and the second metal 133*b* expands relatively big, so that the bimetal 133 is bent toward the first gripper body III.

Considering the thickness (several um) of the electrode leads 30, it is preferable to design the bimetal 133 by selecting two metals 133*a*, 133*b*, so that it can bend more than the thickness of the electrode leads 30 in the ignition risk range (70° C. to 120° C.)

During charging and discharging of the secondary battery, in the case of normal operation, there is no risk of ignition because the temperature does not rise or even if it rises, it rises within a range below the ignition point, and as shown in FIG. 2, the gripper body 110 and the contact member 120 maintain the pressured state to the electrode leads 30.

During charging and discharging of the secondary battery, in case of an abnormal operating state due to an internal defect, etc., when the temperature rises to a range above the ignition point, as shown in FIG. 11, the bimetal 133 is bent and pushed upward in the direction of the first gripper body 111 by the heat transferred from the secondary battery to the bimetal 133 through the heat conducting part 140. Accordingly, the gripper body part 110 and the contact member 120 release the pressured state to the electrode leads 30. As a result, power supply through the electrode leads 30 is cut off, thereby preventing the risk of ignition in the secondary battery.

FIG. 12 is a schematic diagram of a charging and discharging device according to an exemplary embodiment of the present invention, and FIG. 13 is a diagram of a charging and discharging device according to an exemplary embodiment of the present invention.

Referring to these diagrams, the secondary battery charging and discharging device 1000 according to an exemplary embodiment of the present invention includes a power conversion part 1200 that converts output power supplied from the gripper assembly 1100 for charging and discharging the secondary battery and a current source into a power suitable for battery charging.

The gripper assembly 1100 for charging and discharging a secondary battery is as described above, and since the charging and discharging device 1000 according to the present invention includes the above-described gripper assembly 1100, when the temperature rises to an abnormal range due to an internal defect, etc. during charging and discharging of the secondary battery, the shape of the safety block part is deformed, and the pressured state of the electrode lead by the gripper body part is released to block the flow of current. Therefore, there is an effect of preventing the risk of ignition in the secondary battery.

The power conversion part 1200 serves to convert output power P supplying energy to be charged to the secondary battery into power suitable for charging the battery. In one specific example, the power conversion part may be electrically connected to a current channel of each of multiple secondary batteries. The power conversion part 1200 may include a DC/DC converter and a bidirectional linear current source. The DC/DC converter and the bidirectional linear current source may be installed in each current channel to charge/discharge each of multiple batteries connected in series or in parallel.

In addition, the charging and discharging device 1000 according to an exemplary embodiment of the present invention may further include: a pressing plate 1300 installed in numbers side by side, coupled to each other so as to be able to adjust the distance between them, and configured such that a secondary battery 1 is interposed in a gap formed therebetween; a support member 1400 installed for support; a movable member 1500 installed to face the support member 1400; a guide member 1600 for guiding the pressing plate 1300 to move in the direction of adjusting the gap; and a pressure driving part 1700 configured to press and release the pressure on both sides of the secondary battery 1 between the pressing plates 1300 by moving the movable member back and forth.

The pressing plate 1300 is for pressurizing the secondary battery 1, and it is vertically installed side by side in numbers between the support member 1400 and the movable member 1500 so as to simultaneously press multiple secondary batteries 1. It is coupled to one another so that the distance between them can be adjusted by moving the movable member 1500 back and forth, and the secondary battery 1 is inserted into the gap formed between one.

The pressing plate 1300 may be configured to be movable in the direction of adjusting the gap (z-axis direction) by a guide member 1600 described later to apply pressure to the secondary battery in the charging and discharging process for activation or testing of the secondary battery, and the pressing plate 1300 may be provided with a sliding coupling part (not illustrated) coupled so that the guide member 1600 can slide through.

The support member 1400 is installed for support, and for example, it can be installed vertically on the frame 1800 installed on the ground, and as another example, it can be installed so that it is elastically supported by an elastic support member.

The movable member 1500 is installed to face the support member 1400 and moves back and forth by the pressure driving part 1700 to press and release the pressing plate 1300.

The guide member 1600 guides multiple pressing plates 1300 to move in the direction of adjusting the gap, and for this purpose, it may be composed of an axis member in which one end is fixed to the support member 1400 and the other end is fixed to the movable member 1500, so that it can be placed in the arrangement direction (z-axis direction) of the pressing plate 1300, and a plurality of them may be provided side by side.

The pressure driving part 1700 moves the movable member 1500 back and forth to press and release the secondary battery 1 located between the pressing plates 1300 on both sides, and for this purpose, it may vary in composition including one that uses the back-and-forth motion of a cylinder (not illustrated) and one that converts rotational force of a motor into linear motion.

The gripper assembly 1100 for charging and discharging a secondary battery may be installed in numbers in each pressing plate 1300, and it may be configured to move together with the pressing plate 1300 by being fixed to the pressing plate 1300.

The charging and discharging device according to such exemplary embodiment has an effect of applying a charging current or a discharging current to each of the secondary batteries in a state in which each of the multiple secondary batteries is pressurized.

As above, the exemplary embodiments of the present invention have been described with reference to diagrams, but it should be understood by those skilled in the art or those of ordinary skill in the art that the present invention can be variously modified and changed without departing from the spirit and technical scope of the present invention described in the accompanying claims.

The invention claimed is:

1. A gripper assembly for charging and discharging a secondary battery, the gripper assembly comprising:

a gripper body part configured to press an electrode lead of the secondary battery;

a contact member coupled to one side of the gripper body part, the contact member being configured to be pressed on a surface of the electrode lead;

a safety block part located in the gripper body part, the safety block part having a shape that is transformed when heat is transferred from the secondary battery to release a pressed state of the electrode lead by the gripper body part; and a heat conducting part configured to connect the secondary battery and the safety block part.

2. The gripper assembly of claim 1, wherein the gripper body part comprises:

a first gripper body configured to come into contact with a first surface of the electrode lead;

a second gripper body configured to come into contact with a second surface of the electrode lead opposite the first surface; and a connecting member connecting the first gripper body and the second gripper body.

3. The gripper assembly of claim 2, wherein the safety block part is located on at least one of the first gripper body and the second gripper bodies body.

4. The gripper assembly of claim 2, wherein the safety block part comprises a shape alloy, and wherein the at least one of the first gripper body and the second gripper body includes an accommodation groove accommodating the shape-memory alloy therein.

5. The gripper assembly of claim 4, wherein the shape-memory alloy is restored to an original form in the temperature range of 70° C. to 120° C.

6. The gripper assembly of claim 2, wherein the safety block part comprises a thermally expandable metal having a thermal expansion coefficient greater than 0.02 mm/mh° C. and wherein the at least one of the first gripper body and the second gripper body includes an accommodation groove accommodating the thermally expandable metal therein.

7. The gripper assembly of claim 2, wherein the safety block part comprises a bimetal made of two metals having different coefficients of thermal expansion, and wherein the at least one of the first gripper body and the second gripper body includes an accommodation groove accommodating the bimetal is formed in the second gripper body.

8. The gripper assembly of claim 7, wherein the bimetal bends to a greater degree than a thickness of the electrode lead in a temperature range of 70° C. to 120° C.

9. The gripper assembly of claim 1, wherein the contact member is a metal material.

10. The gripper assembly of claim 9, wherein the heat conducting part is a heat conducting wire made of an aluminum or a metal having a higher thermal conductivity than aluminum.

11. A secondary battery charging and discharging device, comprising:

the gripper assembly of claim 1; and a power conversion part configured to convert output power supplied from a current source into power suitable for battery charging, the power conversion part being configured to apply current to the secondary battery through the contact member of the gripper assembly.

12. The secondary battery charging and discharging device of claim 11, further comprising:

a plurality of pressing plates movable relative to each other to adjust a gap between adjacent pressing plates, each gap being configured to receive a secondary battery therein;

a support member located at a first end of the plurality of pressing plates;

a movable member located at a second end of the plurality of pressing plates opposite the support member;

a guide member configured to guide each pressing plate of the plurality of pressing plates to move to adjust the gap; and a pressure driving part configured to press and release pressure on opposite sides of the secondary battery in the gap by moving the movable member back and forth.

13. The secondary battery charging and discharging device of claim 12, wherein the gripper assembly is provided in plurality, each gripper assembly being fixed to a corresponding pressing plate of the plurality of pressing plates.

* * * * *